United States Patent [19]
Neeff

[11] 3,775,048
[45] Nov. 27, 1973

[54] PROCESS FOR THE CONTINUOUS DYEING OF POLYESTER FIBERS WITH ANTHRAQUINONE DYESTUFFS

[75] Inventor: Rütger Neeff, Leverkusen, Germany
[73] Assignee: Bayer Aktiengesellschaft, Leverkusen, Germany
[22] Filed: Apr. 7, 1971
[21] Appl. No.: 132,169

[30] Foreign Application Priority Data
Apr. 13, 1970  Germany.................. P 20 17 504.6

[52] U.S. Cl.................................. 8/39, 8/25, 8/94, 8/174
[51] Int. Cl............................................. D06p 1/20
[58] Field of Search .................... 8/39, 174, 25, 94; 260/249

[56] References Cited
UNITED STATES PATENTS

| | | | |
|---|---|---|---|
| 2,184,559 | 12/1939 | Mellor et al. | 8/175 |
| 2,274,751 | 3/1942 | Sowter et al. | 8/173 |
| 3,473,175 | 10/1969 | Sieber | 8/139.1 |
| 3,667,898 | 6/1972 | Bergman et al. | 8/94 |
| 3,510,243 | 5/1970 | Seuret et al. | 8/39 |
| 3,074,945 | 1/1963 | Staeuble et al. | 260/249 |
| 3,459,729 | 8/1969 | Crotti et al. | 260/249 X |

FOREIGN PATENTS OR APPLICATIONS
1,581,325  9/1969  France.................................. 8/174

Primary Examiner—Leon D. Rosdol
Assistant Examiner—T. J. Herbert, Jr.
Attorney—Plumley & Tyner

[57]  ABSTRACT

Process for the continuous dyeing of synthetic fibre materials from organic solvents wherein the fiber materials are impregnated with solutions of anthraquinone dyestuffs of the formula

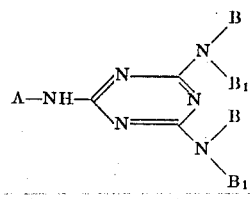

in which A, B and $B_1$ have the meaning given below, in organic water-immiscible solvents and are subsequently subjected to a heat treatment. There are obtained without originating waste waters, dyeings with excellent fastness properties and high dyestuff yields.

12 Claims, No Drawings

PROCESS FOR THE CONTINUOUS DYEING OF POLYESTER FIBERS WITH ANTHRAQUINONE DYESTUFFS

The invention relates to a process for the continuous dyeing of synthetic fibre materials from organic solvents; more particularly it concerns a process for the continuous dyeing of synthetic fibre materials from organic solvents wherein the fiber materials are impregnated with dyeing liquors containing anthraquinone dyestuffs of the formula

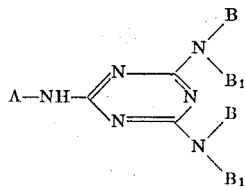

in which
A means an optionally substituted anthraquinone radical preferably consisting of not more than four fused rings;
B means hydrogen or a $C_1$–$C_{18}$-alkyl radical, a $C_3$–$C_{11}$- alkylene-oxyalkyl radical or a cycloalkyl radical;
$B_1$ means a $C_1$–$C_{18}$-alkyl radical, $C_3$–$C_{11}$-alkylene-oxyalkyl radical, cycloalkyl radical, aralkyl radical or a phenyl radical which may be substituted by $C_1$–$C_{12}$-alkyl or alkoxy groups;
B and $B_1$ together may form an alkylene radical with four to six carbon atoms, which may be interrupted by -O- or -S-; with the proviso that the sum total of carbon atoms contained in the substituent(s) B and $B_1$ amounts to at least four and at most 36,
and are subsequently subjected to a heat treatment.

Anthraquinone dyestuffs to be preferably used are those of the formula

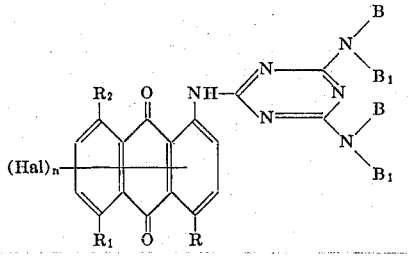

in which
B and $B_1$ have the same meaning as above,
R means hydrogen, a hydroxy group, a lower alkoxy group, an amino group, a lower alkylamino group, a cycloalkylamino radical, a phenyl radical which may be substituted by $C_1$–$C_{12}$-alkyl or alkoxy radicals, a $C_1$–$C_8$-alkanoylamino group;
$R_1$ and $R_2$, independently of one another, mean hydrogen, halogen atoms, hydroxy, nitro or amino groups;
Hal means chlorine or bromine; and
n means 0 – 2.

If the anthraquinone radicals A contain four fused rings, suitable radicals A are 1,9-isothiazole-anthrone, 1,9-pyrazole-anthrone, 1,9-anthrapyrimidine and N-methyl-1,9-anthrapyridone.

For B and $B_1$ there may be mentioned for example: as $C_1$–$C_{18}$-alkyl radicals, the methyl, ethyl, propyl, isopropyl, n-butyl, isobutyl, sec.-butyl, tert.-butyl, n-pentyl, isoamyl, sec.-pentyl, neopentyl, n-hexyl, methyl-pentyl, dimethyl-butyl, n-heptyl, methyl-hexyl, dimethyl-pentyl, trimethyl-butyl, n-oxtyl, isooctyl, methyl-heptyl, dimethyl-hexyl, trimethyl-pentyl, tetramethyl-butyl, n-nonyl, isononyl, dimethyl-heptyl, trimethylhexyl, decyl, undecyl, dodecyl, 2,2-dimethyldecyl, tetradecyl, hexadecyl and octadecyl radical; as $C_3$–$C_{11}$-alkylene-oxyalkyl radicals, the 2-methoxyethyl-, 2-ethoxyethyl, 2-butoxyethyl, 3-methoxypropyl, 3-ethoxypropyl, 3-butoxypropyl and 3-(2-ethylhexoxy)-propyl radicals; as cycloalkyl radicals the cyclohexyl, methylcyclohexyl, 4-tert.-butylcyclohexyl, 4-isooctylcyclohexyl or 4-cyclohexyl-cyclohexyl radical;

for $B_1$ furthermore as aralkyl radicals, the benzyl, phenylethyl, phenylpropyl or dodecyl-benzyl radicals;

as alkyl-phenyl radicals, the methyl-, dimethyl-or trimethyl-phenyl radicals, the ethyl-, diethyl- or triethyl-phenyl radicals, the propyl-, isopropyl-, butyl-, isobutyl-, sec.-butyl-, isooctyl-phenyl- or dodecyl-phenyl radical;

as alkoxy-phenyl radicals, the methoxy-, dimethoxy-, ethoxy-, diethoxy-, propoxy-, diisopropoxy-, butoxy- or pentoxy-phenyl radical.

Examples of alkylene radicals jointly formed by $B_1$ and $B_2$ and optionally interrupted by -O- or -S- are primarily the tetramethylene, pentamethylene, hexamethylene, ethylene-oxyethylene and ethylene-thioethylene radicals.

For R there may be mentioned as lower alkoxy groups $C_1$–$C_4$-alkoxy groups such as the methoxy, ethoxy, i-propoxy or butoxy group ; and as lower alkyl-amino groups $C_1$–$C_6$-alkylamino groups such as the methyl amino, ethyl amino, n-butyl amino, sec-butyl amino and i-hexyl amino group.

The dyestuffs to be used according to the invention for dyeing from organic solvents are obtained according to known processes, for example, by the reaction of suitable aminoanthraqui-nones with cyanuric acid halides and subsequent condensation of the resultant 2,4-dihalo-6-(1-anthraquinonylamino)-1,3,5-triazines with one or more primary or secondary amines; the condensation with two different amines can be carried out either with a mixture of these amines or in steps.

Organic solvents suitable for the process according to the invention are those solvents which are not miscible with water and whose boiling points lie between 40° and 150°C, for example, aromatic hydrocarbons such as toluene or xylene; halogenated hydrocarbons, especially aliphatic chlorinated hydrocarbons such as methylene chloride, chloroform, carbon tetrachloride, 1,1-dichloroethane, 1,2-dichloroethane, 1,1,2-trichloroethane, 1,1,1,2-tetrachloroethane, 1,1,2,2-tetrachloro-ethane, pentachloroethane, 1-chloropropane, 1,2-dichloropropane, 1,1,1-trichloropropane, 1-chlorobutane, 2-chlorobutane, 1,4-dichlorobutane, 1-chloro-2-methylpropane or 2-chloro-2-methylpropane; as well as aliphatic fluorinated or fluoro-chlorinated hydrocarbons such as perfluoro-n-hexane, 1,2,2-trifluoro-trichloroethane, and 1,1,1-trifluoro-pentachloro-propane; and aromatic chlorinated and fluorinated hydrocarbons such as chlorobenzene, fluorobenzene, chlorotoluene and benzotrifluoride.

Tetrachloroethylene, trichloroethylene and 1,1,1-trichloroethane have proved particularly satisfactory. Mixtures of these solvents can also be used.

The synthetic fibre materials to be dyed according to the process of the invention are primarily fibre materials consisting of polyesters, e.g. polyethylene terephthalates or polyesters from 1,4-bis-(hydroxymethyl)-cyclohexane and terephthalic acid; of cellulose triacetate; of synthetic polyamides such as poly-ε-caprolactam, polyhexamethylene-diamine adipate or poly-ω-aminoundecanic acid; of polyurethanes; of polyolefines; or of polycarbonates. The fibre materials may be present in the form of fabrics and knitted fabrics.

For dyeing, the dyestuffs to be used according to the invention are dissolved in the water-immiscible organic solvents or they are added to the latter in the form of solutions in solvents of unlimited miscibility with these solvents, such as alcohols, dimethyl formamide, dimethyl acetamide, dimethyl sulphoxide or sulpholan; the synthetic fibre materials are impregnated with the resultant clear dyestuff solutions which may also contain soluble non-ionic auxiliaries for improving the levelness of the dyeings, for example, the known interface-active ethoxylation and propoxylation products of fatty alcohols, alkylphenols, fatty acid amides and fatty acids. The dyestuffs are subsequently fixed on the fibre materials by a heat treatment. The heat treatment may consist in a brief treatment with dry heat at 120° – 230°C, with an intermediate drying optionally preceding the treatment with dry heat; or in a treatment of the fibre materials with overheated solvent vapour at 100° – 150°C. Small proportions of non-fixed dyestuff can be washed out by a short treatment with the cold organic solvent. It should be noted that mixtures of the dyestuffs to be used according to the invention sometimes give a better dyestuff yield than the individual dyestuffs and that they may be more readily soluble in the organic medium.

With the aid of the process according to the invention it is possible, when dyeing from organic solvents, to achieve on synthetic fibre materials dyeings which are characterised by a high dyestuff yield, very good build-up and outstanding fastness properties, especially very good fastness to thermo-fixing, washing, rubbing and light. Another advantage of the dyestuffs to be used according to the invention consists in their high solubility in organic solvents, especially in tetrachloroethylene, trichloroethylene, 1,1,1trichloroethane and 1,1,1-trichloropropane, which enables the dyeing to be carried out also without the use of solubilizers.

The parts given in the following Examples are parts by weight.

EXAMPLE 1

A fabric of polyethylene terephthalate fibres is impregnated at room temperature with a clear yellow solution containing
  10 parts 2,4-bis-(diethylamino)-6-(1-anthraquinonylamino)-1,3,5-triazine in
  990 parts tetrachloroethylene.

After squeezing to a weight increase of 60 percent, the fabric is dried at 80°C for one minute. The dyestuff is subsequently fixed by heating the fabric at 190° – 220°C for 45 seconds. The small proportion of non-fixed dyestuff is subsequently washed out by a short treatment in cold tetrachloroethylene for 20 seconds. After drying, there is obtained a clear yellow dyeing which is characterised by its high dyestuff yield, very good build-up and outstanding fastness properties, especially by very good fastness to thermofixing, washing, rubbing and light.

Equally satisfactory clear yellow dyeings were obtained in an analogous way also on fabrics of
  a. cellulose acetate;
  b. synthetic polyamides or polyurethanes; and
  c. polypropylene fibres,
but the thermosolisation was carried out for
  a. at 200° – 220°C;
  b. at 170° – 200°C; and
  c. at 120° – 150°C.

Equally satisfactory dyeings were also obtained when the 990 parts tetrachloroethylene were replaced with the same amount of one of the following solvents: methylene chloride, chloroform, carbon tetrachloride, dichloroethane, trichloroethane, trichloroethylene, tetrachloroethane, dichloropropane, 1,1,1-trichloropropane, chlorobutane, dichlorobutane, perfluoro-n-hexane, 1,2,2-trifluoro-trichloroethane and 1,1,1-trifluoro-pentachloropropane.

The dyestuff used above had been prepared as follows:

20 parts 2,4-dichloro-6-(1-anthraquinonylamino)-1,3,5-triazine and 20 parts diethylamine are heated in 120 parts ethanol at boiling temperature until the formation of the dyestuff is completed. The product which crystallises in the form of yellow prisms is filtered off with suction after cooling, washed with ethanol and water, and after drying, there are obtained 22.7 parts 2,4-bis-(diethylamino)-6-(1-anthraquinonylamino)-1,3,5-triazine = 92 percent of theory.

EXAMPLE 2

A knitted fabric of polyhexamethylene-diamine adipate filaments is impregnated at room temperature with a clear yellow solution containing
  10 parts 2-(3-methoxypropylamino)-4-(di-n-propylamino)-6-(1-anthraquinonylamino)-1,3,5-triazine and 7 parts nonylphenol heptaethylene glycol ether in 983 parts tetrachloroethylene.

After squeezing to a weight increase of 60 percent, the knitted fabric is dried at 80°C for 1 minute. The dyestuff is subsequently fixed by heating the knitted fabric at 192°C for 45 seconds. Small proportions of non-fixed dyestuff are subsequently washed out by a short treatment of about 20 seconds in cold tetrachloroethylene. After drying, there is obtained a clear yellow dyeing which is characterised by its high dyestuff yield, very good build-up and outstanding fastness properties, especially by very good fastness to thermofixing, washing, rubbing and light.

An equally satisfactory dyeing was obtained when the 983 parts tetrachloroethylene were replaced with the same amount of toluene, xylene, chlorobenzene or dichlorobenzene.

The dyestuff used above had been prepared as follows:

33.4 parts 2,4-dichloro-6-(1-anthraquinonylamino)-1,3,5-triazine in 410 parts chlorobenzene are slowly mixed at 75°C with a solution of 17.6 parts 3-methoxy-propylamine in 75 parts chlorobenzene and the mixture is stirred at 75°C for about 4 hours. 20 Parts di-n-propylamine are subsequently added and stirring is continued at 75°C until the dyestuff formation is completed. The chlorobenzene is then driven off with steam and after filtering off with suction, washing with water and drying, there are obtained 45.5 parts 2-(3-methoxy-propylamino)-4-(di-n-propylamino)-6-(1-anthraquinonylamino)-1,3,5-triazine = 97.5 percent of theory.

EXAMPLE 3

A fabric of polypropylene fibres is impregnated at room temperature with a clear yellow solution containing 10 parts 2,4-bis-(di-n-butylamino)-6-(1-anthraquinonyl-amino)-1,3,5-triazine and 7 parts nonylphenol heptaethylene glycol ether in 983 parts tetrachloroethylene.

After squeezing to a weight increase of 60 percent, the fabric is dried at 80°C for one minute. The dyestuff is subsequently fixed by heating the fabric at 140°C for 30 seconds. Any non-fixed dyestuff particles can be washed out by a short treatment in the cold solvent. A clear yellow dyeing is obtained which is characterised by its high dyestuff yield, very good build-up and very good fastness properties, especially by very good fastness to thermofixing, washing, rubbing and light.

The dyestuff used above can be prepared as described in Example 1, using 35.3 parts di-n-butylamine, instead of 20 parts diethylamine.

EXAMPLE 4

A fabric of poly-1,4-cyclohexane-dimethylene terephthalate is impregnated at room temperature with a clear red solution containing 10 parts 2,4-bis-(di-n-propylamino)-6-(4-hydroxy-1-anthraquinonylamino)-1,3,5-triazine and 7 parts nonylphenol heptaethylene glycol ether in 983 parts tetrachloroethylene.

After squeezing to a weight increase of 60 percent, the fabric is dried at 80°C for 1 minute. The dyestuff is subsequently fixed on the fibre by heating the fabric at 190° – 220°C for 45 seconds. The small proportion of non-fixed dyestuff is then removed by a short treatment of 20 seconds in cold tetrachloroethylene. After drying, there is obtained a clear bluish red dyeing which is characterised by its high dyestuff yield, very good texture and outstanding fastness properties, especially by very good fastness to thermofixing, washing, rubbing and light.

The dyestuff used above had been prepared as follows:

20 parts 2,4-dicholoro-6-(4-hydroxy-1-anthraquinonyl-amino)-1,3,5-triazine are mixed in 100 parts chlorobenzene at 60° – 70°C with 24 parts di-n-propylamine, and the mixture is stirred at 120°C until the dyestuff formation is completed. The chlorobenzene is driven off with steam, the precipitated dyestuff is filtered off with suction and after drying, there are obtained 26.2 parts 2,4-bis-(di-n-propylamino)-6-(4-hydroxy-1-anthraquinonylamino)-1,3,5-triazine = 98 percent of theory.

EXAMPLE 5

A fabric of anionic-modified polyethylene terephthalate fibres (Dacron 64) is impregnated at room temperature with a clear blue solution containing 10 parts 2,4-bis-(diethylamino)-6-(4-cyclohexylamino-1-anthraquinonylamino)-1,3,5-triazine and 7 parts nonylphenol heptaethylene glycol ether in 983 parts tetrachloroethylene.

After squeezing to a weight increase of 60 percent the fabric is dried at 80°C for 1 minute. The dyestuff is subsequently fixed by heating the fabric at 190° – 220°C for 45 seconds. The small proportion of non-fixed dyestuff is subsequently washed out by a short treatment of 20 seconds in cold tetrachloroethylene. After drying, there is obtained a clear blue dyeing which is characterised by its high dyestuff yield, very good texture and good fastness properties, especially by good fastness to thermofixing, washing rubbing and light.

The dyestuff used above had been prepared as follows:

15 parts 2,4-dichloro-6-(4-cyclohexylamino-1-anthraquinonylamino)-1,3,5-triazine are mixed in 100 parts chlorobenzene at 40° – 45°C with 11 parts diethylamine, and the mixture is subsequently stirred at 95° – 100°C until the dyestuff formation is completed. The chlorobenzene is driven off with steam, and after drying, there are obtained 17 parts 2,4-bis-(diethylamino)-6-(4-cyclohexylamino-1-anthraquinonylamino)-1,3,5-triazine = 98 percent of theory.

EXAMPLE 6

A fabric of polyethylene terephthalate fibres is impregnated at room temperature with a clear blue solution containing 10 parts 2,4-bis-(di-n-propylamino)-6-[4-(4-methylphenyl-amino)-1-anthraquinonylamino]-1,3,5-triazine in 990 parts 1,1,1-trichloroethane.

After squeezing to a weight increase of 60 percent, the dyestuff is fixed by treating the fabric for 45 seconds with overheated 1,1,1-trichloroethane vapour at 140°C. The small proportion of non-fixed dyestuff is subsequently washed out by a short rinsing in cold 1,1,1-trichloroethane. After drying, there is obtained a clear blue dyeing which is characterised by its high dyestuff yield, very good build-up and outstanding fastness properties.

The dyestuff used above had been prepared as described in Example 5, but with the use of 15 parts 2,4-dichloro-6-[4-(4-methylphenylamino)-1-anthraquinonylamino]-1,3,5-triazine, instead of 15 parts 2,4-dichloro-6-(4-cyclohexylamino-1-anthraquinonylamino)-1,3,5-triazine, and of 14.5 parts di-n-propyl-amine, instead of 11 parts diethylamine.

EXAMPLE 7

A knitted fabric of anionic-modified polyamide fibres (nylon T 844 ) is impregnated at room temperature with a blue solution containing 10 parts of the dyestuff described in Example 5 and 7 parts nonylphenol heptaethylene glycol ether in 983 parts tetrachloroethylene.

After squeezing to a weight increase of 60 percent, the knitted fabric is dried at 80°C for one minute. The dyestuff is subsequently fixed by heating the knitted fabric at 192°C for 45 seconds. Small proportions of non-fixed dyestuff are then washed out by a short treatment in cold tetrachloroethylene. After drying, there is obtained a blue dyeing which is characterised by its high dyestuff yield, very good build-up and very good fastness properties, especially by very good fastness to thermofixing, washing, rubbing and light.

EXAMPLE 8

A fabric of cellulose triacetate fibres is impregnated at room temperature with a clear blue solution containing 10 parts 2,4-di-(2-ethylhexylamino)-6-(5-amino-4,8-dihydroxy-1-anthraquinonylamino)-1,3,5-triazine and 7 parts nonylphenol heptaethylene glycol ether in 983 parts tetrachloroethylene.

After squeezing to a weight increase of 60 percent, the fabric is dried at 80°C for one minute. The dyestuff is subsequently fixed by heating the fabric at 215°C for one minute. A clear blue dyeing is obtained, which is characterised by its high dyestuff yield, good build-up and good fastness properties, especially by good fastness to thermofixing, washing, rubbing and light.

The dyestuff used above had been prepared as follows:

15 parts 2,4-dichloro-6-(5-amino-4,8-dihydroxy-1-anthraquinonylamino)-1,3,5-triazine are mixed at 65° – 70°C with 31 parts 2-ethylhexylamine, and the mixture is then stirred at 120°C until the dyestuff formation is completed. Some residue is filtered off, the chlorobenzene is driven off with steam, and after filtering off with suction, washing with water and drying, there are obtained 19.7 parts 2,4-di-(2-ethylhexylamino)-6-(5-amino-4,8-dihydroxy-1-anthraquinonyl-amino)-1,3,5-triazine = 91 percent of theory.

EXAMPLE 9

A fabric of polyethylene terephthalate fibres is impregnated at room temperature with a clear blue solution containing 10 parts of the dyestuff mixture described below and 7 parts nonylphenol heptaethylene glycol ether in 983 parts tetrachloroethylene.

After squeezing to a weight increase of 60 percent, the knitted fabric is dried at 80°C for one minute. The dyestuff is subsequently fixed by heating the knitted fabric at 190° – 220°C for 45 seconds. A small proportion of non-fixed dyestuff is then washed out by a short treatment in cold tetrachloroethylene. After drying, there is obtained a blue dyeing which is characterised by its high dyestuff yield, very good build-up are very good fastness properties, especially by very good fastness to thermofixing, washing, rubbing and light.

The dyestuff used above had been prepared as follows:

7.5 parts 2,4-dichloro-6-(5-amino-4,8-dihydroxy-1-anthraquinonylamino)-1,3,5-triazine and 7.5 parts 2,4-dichloro-6-(8-amino-4,5-dihydroxy-1-anthraquinonylamino)-1,3,5-triazine are mixed in 100 parts chlorobenzene at 60° – 70°C with 20 parts di-n-butylamine and the mixture is subsequently stirred at 115° – 120°C until the dyestuff formation is completed. Some residue is filtered off, the chlorobenzene is driven off with steam, and after filtering off with suction, washing with water and drying, there are obtained 19.6 parts of a mixture of about equal parts of 2,4-bis-(di-n-butylamino)-6-(5-amino-4,8-dihydroxy-1-anthraquinonylamino)-1,3,5-triazine and 2,4-bis-(di-n-butylamino)-6-(8-amino-4,5-dihydroxy-1-anthraquinonyl-amino)-1,3,5-triazine = 91.5 percent of theory.

When the dyestuffs used in Examples 1 – 9 were replaced with one of the dyestuffs listed in the following Table, then dyeings of equally satisfactory fastness properties were obtained on fabrics of polyester, triacetate, polyamide, polyurethane, polycarbonate and polyolefine fibres in the shades specified in the Table:

| Example | Dyestuff | Shade |
|---|---|---|
| 10 | 2,4-bis-(dimethylamino)-6-(1-anthraquinonylamino)-1,3,5-triazine | yellow |
| 11 | 2-methylamino-4-n-dodecylamino-6-(1-anthraquinonylamino)-1,3,5-triazine | Do. |
| 12 | 2,4-di-piperidino-6-(6,7-dichloro-1-anthraquinonylamino)-1,3,5-triazine | Do. |
| 13 | 2-(3-ethoxypropylamino)-4-n-butylamino-6-(6-chloro-1-anthraquinonylamino)-1,3,5-triazine | Do. |
| 14 | 2-morpholino-4-di-n-propylamino-6-(1-anthraquinonylamino)-1,3,5-triazine | Do. |
| 15 | 2-benzylamino-4-n-tetradecylamino-6-(1-anthraquinonylamino)-1,3,5-triazine | Do. |
| 16 | 2-(2-phenylethylamino)-4-di-n-butylamino-6-(1-anthraquinonylamino)-1,3,5-triazine | Do. |
| 17 | 2-anilino-4-n-hexadecylamino-6-(1-anthraquinonylamino)-1,3,5-triazine | Do. |
| 18 | 2-(4-tert.-butylanilino)-4-isobutylamino-6-(1-anthraquinonylamino)-1,3,5-triazine | Do. |
| 19 | 2-(4-isooctylanilino)-4-isopropylamino-6-(1-anthraquinonylamino)-1,3,5-triazine | Do. |
| 20 | 2-(4-methoxyanilino)-4-di-n-butylamino-6-(4-hydroxy-1-anthraquinonylamino)-1,3,5-triazine | red |
| 21 | 2-(3-isoamyloxyanilino)-4-(4-tert.-butylcyclohexylamino)-6-(4-hydroxy-1-anthra-quinonylamino)-1,3,5-triazine | Do. |
| 22 | 2-(3,4-diisopropoxyanilino)-4-diethylamino-6-(4-hydroxy-1-anthraquinonylamino)-1,3,5-triazine | Do. |
| 23 | 2-thiomorpholino-4-(2-ethylhexylamino)-6-(4-hydroxy-1-anthraquinonylamino)-1,3,5-triazine | red |
| 24 | 2-(2-methoxyethylamino)-4-di-n-propylamino-6-(4-hydroxy-1-anthraquinonylamino)-1,3,5-triazine | Do. |
| 25 | 2-(3-n-butoxypropylamino)-4-tert.-butyl-amino-6-(4-hydroxy-1-anthraquinonylamino)-1,3,5-triazine | Do. |
| 26 | 2,4-di-isobutylamino-6-(4-methoxy-1-anthraquinonylamino)-1,3,5-triazine | yellowish red |
| 27 | 2-methylamino-4-n-octadecylamino-6-(4-ethoxy-1-anthraquinonylamino)-1,3,5-triazine | Do. |
| 28 | 2-methylamino-4-(4-dodecylbenzylamino)-6-(4-n-propoxy-1-anthraquinonylamino)-1,3,5-triazine | Do. |
| 29 | 2,4-bis-(diethylamino)-6-(4-amino-1-anthraquinonylamino)-1,3,5-triazine | violet |
| 30 | 2-(3-ethoxypropylamino)-4-diethylamino-6-(4-amino-1-anthraquinonylamino)-1,3,5-triazine | Do. |
| 31 | 2,4-di-n-propylamino-6-(4-methylamino-1-anthraquinonylamino)-1,3,5-triazine | blue |
| 32 | 2-(2-methoxyethylamino)-4-isopropylamino-6-(4-n-butylamino-1-anthraquinonylamino)-1,3,5-triazine | Do. |
| 33 | 2,4-di-methylamino-6-(4-(4-tert.-butylcyclohexylamino)-1-anthraquinonylamino)-1,3,5-triazine | Do. |
| 34 | 2,4-bis-(di-n-propylamino)-6-(4-anilino-1-anthraquinonylamino)-1,3,5-triazine | blue |
| 35 | 2,4-di-ethylamino-6-[4-(4-tert.-butylanilino)-1-anthraquinonylamino]-1,3,5-triazine | Do. |
| 36 | 2-(2-methoxyethylamino)-4-methylamino-6-[4-(4-isooctylanilino)-1-anthrquinonylamino]-1,3,5-triazine | Do. |
| 37 | 2-methylamino-4-N-methyl-octadecylamino-6-[4-(2-isopropylanilino)-1-anthraquinonyl-amino]-1,3,5-triazine | Do. |
| 38 | 2,4-di-piperidineo-6-[4-(2,4,6-trimethylanilino)-1-anthraquinonylamino]-1,3,5-triazine | Do. |
| 39 | 2-hexamethylenimino-4-methylamino-6-[4-(2,4-dimethyl-6-ethyl-anilino)-1-anthraquinonylamino]-1,3,5-triazine | Do. |
| 40 | 2,4-bis-(diethylamino)-6-[4-(4-methyl-2,6-diethylanilino)-1-anthraquinonylamino]-1,3,5-triazine | Do. |
| 41 | 2,4-di-methylamino-6-[4-(4-dodecylanilino)-1-anthraquinonylamino]-1,3,5-triazine | Do. |
| 42 | 2-morpholino-4-n-propylamino-6-[4-(2,4,5-trimethylphenylamino)-1-anthraquinonylamino]-1,3,5-triazine | Do. |
| 43 | 2,4-bis-(di-n-propylamino)-6-[4-(4-methoxyanilino)-1-anthraquinonylamino]-1,3,5-triazine | Do. |

| | | |
|---|---|---|
| 44 | 2,4-bis-(diisopropylamino)-6-[4-(2-ethoxyanilino)-1-anthraquinonylamino]-1,3,5-triazine | Do. |
| 45 | 2,4-bis-(diethylamino)-6-[4-(3,4-diisopropoxyanilino)-1-anthraquinonylamino]-1,3,5-triazine | blue |
| 46 | 2,4-bis-(dimethylamino)-6-[4-(3-isoamyloxyanilino)-1-anthraquinonylamino]-1,3,5-triazine | Do. |
| 47 | 2,4-bis-(diisobutylamino)-6-(4-acetylamino-1-anthraquinonylamino)-1,3,5-triazine | red |
| 48 | 2,4-di-isopropylamino-6-(4-n-butyrylamino-1-anthraquinonylamino)-1,3,5-triazine | Do. |
| 49 | 2,4-bis-(diethylamino)-6-(4-diethylacetylamino-1-anthraquinonylamino)-1,3,5-triazine | Do. |
| 50 | 2,4-bis-(dimethylamino)-6-(4-heptanoyl-(3)-amino-1-anthraquinonylamino)-1,3,5-triazine | Do. |
| 51 | 2-(2-ethylhexylamino)-4-methylamino-6-(4,5,8-trihydroxy-1-anthraquinonylamino)-1,3,5-triazine | Do. |
| 52 | 2,4-bis-(di-n-butylamino)-6-(4-amino-5,8-dichloro-1-anthraquinonylamino)-1,3,5-triazine | violet |
| 53 | 2-piperidino-4-n-butylamino-6-(4,8-dihydroxy-5-nitro-1-anthraquinonylamino)-1,3,5-triazine | bluish red |
| 54 | 2-methylamino-4-(4-isooctylcyclohexylamino)-6-(4,5-dihydroxy-8-nitro-1-anthraquinonylamino)-1,3,5-triazine | Do. |
| 55 | 2-isobutylamino-4-(4-cyclohexylcyclohexylamino)-6-(4,8-dihydro-5-nitro-1-anthraquinonylamino)-1,3,5-triazine | bluish red |
| 56 | 2,4-bis-(n-butylamino)-6-(5,8-dihydroxy-4-amino-1-anthraquinonylamino)-1,3,5-triazine | bluish violet |
| 57 | 2-(3-n-butoxypropylamino)-4-isobutylamino-6-(4,8-dihydroxy-5-amino-1-anthraquinonylamino)-1,3,5-triazine | blue |
| 58 | 2,4-bis-(di-n-propylamino)-6-4,8-dihydroxy-5-amino-1-anthraquinonylamino)-1,3,5-triazine | Do. |
| 59 | 2-(3-ethoxypropylamino)-4-diethylamino-6-(4,5-dihydroxy-8-amino-1-anthraquinonylamino)-1,3,5-triazine | Do. |
| 60 | 2-morpholino-4-(2-ethylhexylamino)-6-(4,5-dihydroxy-8-amino-1-anthraquinonylamino)-1,3,5-triazine | Do. |
| 61 | 2,4-bis-(di-n-propylamino)-6-(4,8-dihydroxy-x-bromo-5-amino-1-anthraquinonylamino)-1,3,5-triazine | Do. |
| 62 | 2-(3-n-butoxypropylamino)-4-ethylamino-6-(4,8-dihydroxy-x-bromo-5-amino-1-anthraquinonylamino)-1,3,5-triazine | Do. |
| 63 | 2,4-bis-(di-n-propylamino)-6-(4,8-dihydroxy-x-bromo-5-amino-1-anthraquinonylamino)-1,3,5-triazine | Do. |
| 64 | 2,4-di-isobutylamino-6-(4,5-dihydroxy-x-bromo-8-amino-1-anthraquinonylamino)-1,3,5-triazine | Do. |
| 65 | 2,4-di-(2-ethylhexylamino)-6-(4,5-dihydroxy-x-bromo-1-anthraquinonylamino)-1,3,5-triazine | blue |
| 66 | 5-(2,4-bis-(di-n-propylamino)-6-triazinylamino)-1,9-isothiazolanthrone | yellow |
| 67 | 4-(2,4-bis-(diethylamino)-6-triazinylamino)-1,9-isothiazolanthrone | Do. |
| 68 | 5-(2,4-bis-(di-isopropylamino)-6-triazinylamino)-1,9-pyrazolanthrone | Do. |
| 69 | 5-(2,4-bis-(diethylamino)-6-triazinylamino)-1,9-anthrapyrimidine | Do. |
| 70 | 4-(2,4-di-isobutylamino-6-triazinylamino)-1,9-anthrapyrimidine | Do. |
| 71 | 4-(2,4-bis-(di-n-butylamino)-6-triazinylamino)-N-methyl-1,9-anthrapyridone | Do. |
| 72 | 4-(2-isopropylamino-4-(3-butoxypropylamino)-6-triazinylamino)-N-methyl-1,9-anthrapyridone | Do. |

EXAMPLE 73

A fabric of polycarbonate fibres is impregnated at room temperature with a clear yellow solution containing 10 parts 2-methylamino-4-[3-(2-ethylhexoxy)-propylamino]-6-(1-anthraquinonylamino)-1,3,5-triazine and 7 parts nonylphenol heptaethylene glycol either in 983 parts tetrachloroethylene. After squeezing to a weight increase of 60 percent, the fabric is dried at 80°C for one minute. The dyestuff is subsequently fixed by heating the fabric at 190° – 220°C for 45 seconds. The small proportion of non-fixed dyestuff is subsequently washed out by a short treatment of 20 seconds in cold tetrachloroethylene. After drying, there is obtained a clear yellow dyeing which is characterised by its high dyestuff yield, very good texture and outstanding fastness properties, especially by very good fastness to thermofixing, washing, rubbing and light.

I claim:

1. Process for the continuous dyeing of synthetic polyester fiber material comprising the steps of
   A. impregnating the fiber material with a non-aqueous dyeing liquor consisting essentially of an organic solvent and an anthraquinone dyestuff;said organic solvent consisting of water-immiscible halogenated hydrocarbon boiling between 40°C and 150°C;

said anthraquinone dyestuff having the formula $$A-NH-\underset{N}{\overset{N}{\underset{\|}{\bigg\langle}}}\underset{N}{\overset{N}{\underset{\|}{\bigg\rangle}}}\underset{B_1}{\overset{B}{\underset{B_1}{\overset{B}{\bigg\langle}}}}$$

in which A is an unsubstituted or substituted anthraquinone radical consisting of not more than four fused rings;

B is hydrogen, $C_1$–$C_{18}$-alkyl, $C_3$–$C_{11}$-alkylene-oxalkyl or cycloalkyl;

$B_1$ is $C_1$–$C_{18}$-alkyl, $C_3$–$C_{11}$-alkylene-oxalkyl-, cycloalkyl, aralkyl, phenyl or phenyl substituted by $C_1$–$C_{12}$-alkyl or alkoxy;

B and $B_1$ together may form an alkylene radical with four to six carbon atoms or an alkylene radical of four to six carbon atoms which may be interrupted by -O- or -S-; with the proviso that the sum total of carbon atoms contained in the substituents B and $B_1$ amounts to at least four and at most 36;

B. subjecting the synthetic polyester fiber material to a heat treatment to fix said anthraquinone dyestuff on said fiber.

2. The process of claim 1 in which said heat treatment step (B) is conducted for a brief period with dry heat at 120°–230°C.

3. The process of claim 1 in which said heat treatment step (B) is conducted in overheated solvent vapor at 100°–150°C.

4. The process of claim 1 in which the anthraquinone dyestuff has the formula

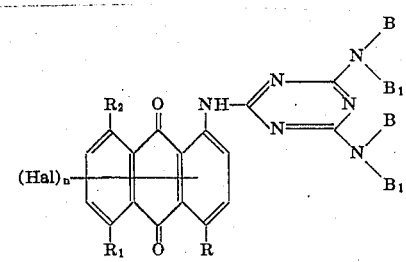

in which B and $B_1$ have the same meaning as in claim 1; R is hydrogen, hydroxy, lower alkoxy, amino, lower alkylamino, cycloalkylamino, phenyl, phenyl substituted by $C_1$–$C_{12}$-alkyl or alkoxy, or $C_1$–$C_3$-alkanoylamino; $R_1$ and $R_2$, independently of one another, are hydrogen, halogen, hydroxy, nitro or amino; Hal means chlorine or bromine; and n is a number 0 to 2.

5. The process of claim 1 in which the anthraquinone dyestuff has the formula

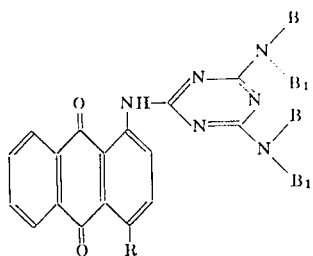

in which B and $B_1$ have the same meaning as in claim 1; and R is hydrogen, hydroxy or lower alkoxy.

6. The process of claim 1 in which the anthraquinone dyestuff has the formula

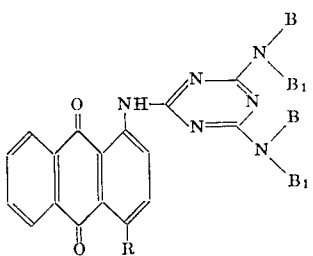

in which B and $B_1$ have the same meaning as in claim 1; and R is amino, lower alkylamino or cycloalkylamino, phenyl, phenyl substituted by $C_1$–$C_8$-alkyl or alkoxy, or $C_1$–$C_8$-alkanoyl-amino.

7. The process of claim 1 in which the anthraquinone dyestuff has the formula

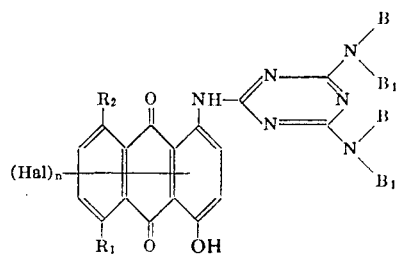

in which B and $B_1$ have the same meaning as in claim 1; $R_1$ and $R_2$, independently of one another, are hydroxy or amino; Hal is chlorine or bromine; and n is a number 0 to 2.

8. The process of claim 1 in which the anthraquinone dyestuff has the formula

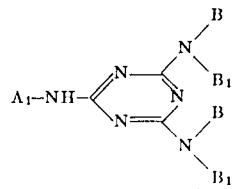

in which B and $B_1$ have the same meaning as in claim 1; and $A_1$ is the radical of 1,9-isothiazole-anthrone, 1,9-pyrazole-anthrone, 1,9-anthrapyrimidine or N-methyl-1,9-anthrapyridone.

9. The process of claim 1 in which said anthraquinone dyestuff is soluble in said water-immiscible organic solvent.

10. The process of claim 9 in which the dyed material is subjected to a subsequent step of (C) rinsing with water-immiscible organic solvent in which said anthraquinone dyestuff is soluble.

11. The process of claim 1 in which said water-immiscible organic solvent is an aliphatic chlorohydrocarbon having a boiling point of between 40° and 150-°C.

12. The process of claim 1 in which said water-immiscible organic solvent is selected from the group consisting of tetrachloroethylene, trichloroethylene, 1,1,-1-trichloroethane, 1,1,1-trichloropropane and mixtures thereof.

* * * * *

UNITED STATES PATENT OFFICE
CERTIFICATE OF CORRECTION

Patent No. 3,775,048    Dated November 27, 1973

Inventor(s) Rutger Neeff

It is certified that error appears in the above-identified patent and that said Letters Patent are hereby corrected as shown below:

Column 7, line 47, "are" should read ---and---.

Column 8, Ex. 18, "butylaniliono" should read ---butylanilino---.

Column 8, Ex. 36, "anthrquinonylamino" should read ---anthraquinonylamino---.

Column 8, Ex. 38, "piperidineo" should read --piperidino---.

Column 11, line 4, "$C_1-C_3-$" should read ---$C_1-C_8-$---.

Signed and sealed this 4th day of February 1975.

(SEAL)
Attest:

McCOY M. GIBSON JR.
Attesting Officer

C. MARSHALL DANN
Commissioner of Patents